US011855802B2

(12) United States Patent
Pfister et al.

(10) Patent No.: US 11,855,802 B2
(45) Date of Patent: *Dec. 26, 2023

(54) METHOD AND SYSTEM FOR MANAGING NETWORK-TO-NETWORK INTERCONNECTION

(71) Applicant: Cisco Technology, Inc., San Jose, CA (US)

(72) Inventors: Pierre Pfister, Chalons-en-Champagne (FR); William Mark Townsley, San Francisco, CA (US); Yoann Desmouceaux, Paris (FR); David Delano Ward, Somerset, WI (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/093,530

(22) Filed: Jan. 5, 2023

(65) Prior Publication Data

US 2023/0155859 A1    May 18, 2023

Related U.S. Application Data

(63) Continuation of application No. 17/671,265, filed on Feb. 14, 2022, now Pat. No. 11,575,540, which is a
(Continued)

(51) Int. Cl.
*H04L 12/46* (2006.01)
*G06F 16/95* (2019.01)

(52) U.S. Cl.
CPC .............. *H04L 12/46* (2013.01); *G06F 16/95* (2019.01)

(58) Field of Classification Search
CPC ................................ H04L 12/46; G06F 16/95
(Continued)

(56) References Cited

U.S. PATENT DOCUMENTS

2010/0142542 A1  6/2010  Van Wie et al.
2011/0060846 A1  3/2011  Waldrop et al.
(Continued)

FOREIGN PATENT DOCUMENTS

EP    3352504    7/2018

OTHER PUBLICATIONS

Yousef Khalidi, "Announcing public preview of Azure Virtual WAN and Azure Firewall" Azure Networking, Jul. 12, 2018 <<https://azure.microsoft.com/en-ca/blog/announcing-public-preview-of-azure-virtual-wan-and-azure-firewall/>>, 11 pages.
(Continued)

*Primary Examiner* — James E Springer
(74) *Attorney, Agent, or Firm* — Lee & Hayes, P.C.

(57) ABSTRACT

This disclosure describes methods and systems to externally manage network-to-network interconnect configuration data in conjunction with a centralized database subsystem. An example of the methods includes receiving and storing, in the centralized database subsystem, data indicative of user intent to interconnect at least a first network and a second network. The example method further includes, based at least in part on the data indicative of user intent, determining and storing, in the centralized database subsystem, a network intent that corresponds to the user intent. The example method further includes providing data indicative of the network intent from the centralized database subsystem to a first data plane adaptor, associated with the first network, and a second data plane adaptor, associated with the second network.

20 Claims, 6 Drawing Sheets

Related U.S. Application Data continuation of application No. 16/799,346, filed on Feb. 24, 2020, now Pat. No. 11,405,236.

(60) Provisional application No. 62/950,829, filed on Dec. 19, 2019.

(58) Field of Classification Search
USPC .......................................................... 370/254
See application file for complete search history.

(56) References Cited

U.S. PATENT DOCUMENTS

| | | | |
|---|---|---|---|
| 2012/0123829 A1 | 5/2012 | Chen et al. | |
| 2019/0238619 A1 | 8/2019 | Mantrana-Exposito | |
| 2019/0253274 A1 | 8/2019 | Van Dussen | |
| 2020/0396121 A1* | 12/2020 | Kumar | H04L 41/0803 |
| 2021/0194725 A1 | 6/2021 | Pfister et al. | |
| 2022/0166646 A1 | 5/2022 | Pfister et al. | |

OTHER PUBLICATIONS

Khalidi, "Azure Networking Fall 2018 update", Azure Networking, Sep. 24, 2018, <<https://azure.microsoft.com/en-ca/blog/azure-networking-fall-2018-update/>>, 19 pages.

"Cloud Interconnect release notes", Google Cloud, retrieved on Mar. 15, 2022 at <<https://cloud.google.com/network-connectivity/docs/interconnect/release-notes>>, 4 pages.

"Creating VLAN attachments", Google Cloud on Mar. 15, 2022 at <<https://cloud.google.com/network-connectivity/docs/interconnect/how-to/partner/creating-vlan-attachments>>, 4 pages.

"Global transit network architecture and Virtual WAN", Feb. 4, 2022, <<https://docs.microsoft.com/en-us/azure/virtual-wan/virtual-wan-global-transit-network-architecture>>, 12 pages.

"Hub-spoke network topology with Azure Virtual WAN", Azure Architecture Center, retrieved on Mar. 15, 2022 at <<https://docs.microsoft.com/en-us/azure/architecture/networking/hub-spoke-vwan-architecture>>, 10 pages.

"Microsoft Azure ExpressRoute", Microsoft Azure ExpressRoute, retrieved on Mar. 15, 2022 at <<https://docs.equinix.com/en-us/Content/Interconnection/Fabric/connections/Fabric-ms-azure.htm>>, 4 pages.

Office Action for U.S. Appl. No. 17/671,265, dated Oct. 12, 2022, Pfister, "Method and System for Managing Network-To-Network Interconnection ", 8 pages.

Office Action for U.S. Appl. No. 16/799,346, dated May 18, 2021, Pfister, "Method and System for Managing Network-To-Network Interconnection ", 12 pages.

"Partner Interconnect overview", Google Cloud, retrieved on Mar. 15, 2022 at <<https://cloud.google.com/network-connectivity/docs/interconnect/concepts/partner-overview>>, 10 pages.

"Quickstart: Create and modify an ExpressRoute circuit", Azure Networking, Jan. 14, 2022, <<https://docs.microsoft.com/en-us/azure/expressroute/expressroute-howto-circuit-portal-resource-manager>>.

"Requesting connections", Google Cloud, retrieved on Mar. 15, 2022 at <<https://cloud.google.com/network-connectivity/docs/interconnect/how-to/partner/requesting-connections>>, 2 pages.

"Tutorial: Create an ExpressRoute association using Azure Virtual WAN", Azure Networking, Jan. 25, 2022, <<https://docs.microsoft.com/en-us/azure/virtual-wan/virtual-wan-expressroute-portal>>, 12 pages.

"What is Azure ExpressRoute?", Azure Networking, Nov. 26, 2021, <<https://docs.microsoft.com/en-us/azure/expressroute/expressroute-introduction>>, 6 pages.

* cited by examiner

METHOD AND SYSTEM FOR MANAGING NETWORK-TO-NETWORK INTERCONNECTION

RELATED APPLICATIONS

This application claims priority to and is a continuation of U.S. patent application Ser. No. 17/671,265, filed on Feb. 14, 2022, claims priority to and is a continuation of U.S. patent application Ser. No. 16/799,346, filed on Feb. 24, 2020, which claims the benefit of U.S. Provisional Application Ser. No. 62/950,829, filed Dec. 19, 2019, which is incorporated herein by reference.

TECHNICAL FIELD

The present disclosure relates generally to network-to-network interconnection and, more specifically, to a methodology for automatic interconnection of enterprise networks based on expressed high-level user intent, and using a centralized database subsystem.

BACKGROUND

Computer networks are becoming more complex and more difficult to manage. For example, recent trends in networking include:
Network micro-segmentation, with segment-based policing such as Application Centric Infrastructure (ACI) and Software Defined Access (SDA);
Service Function Chaining, including to filter or engineer certain types of network traffic; and
Encrypted overlays and software-defined Wide Area Networks (SD-WANs), such as an intelligent WAN (iWAN) or Cisco Viptela and Cisco Meraki networks.

In addition, enterprise networks are becoming increasingly heterogeneous as they are connecting, for example:
Sites via SD-WAN and virtual private networks (VPNs), such as Cisco Viptela and/or Meraki networks;
Private data-centers such as a Cisco ACI or a Kubernetes private data center;
Multiple public clouds, such as an Amazon AWS public cloud and/or a Microsoft Azure public cloud;
Cloud-based applications such as a Microsoft O365 application, a Cisco WebEx application, or cloud-based applications provided by Salesforce; and
Security Infrastructure-As-A-Service applications, such as provided by zScaler.

It can be a complex operation to configure and manage interconnection of such complex and heterogeneous networks.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DESCRIPTION OF EXAMPLE EMBODIMENTS

OVERVIEW

Figure 1:
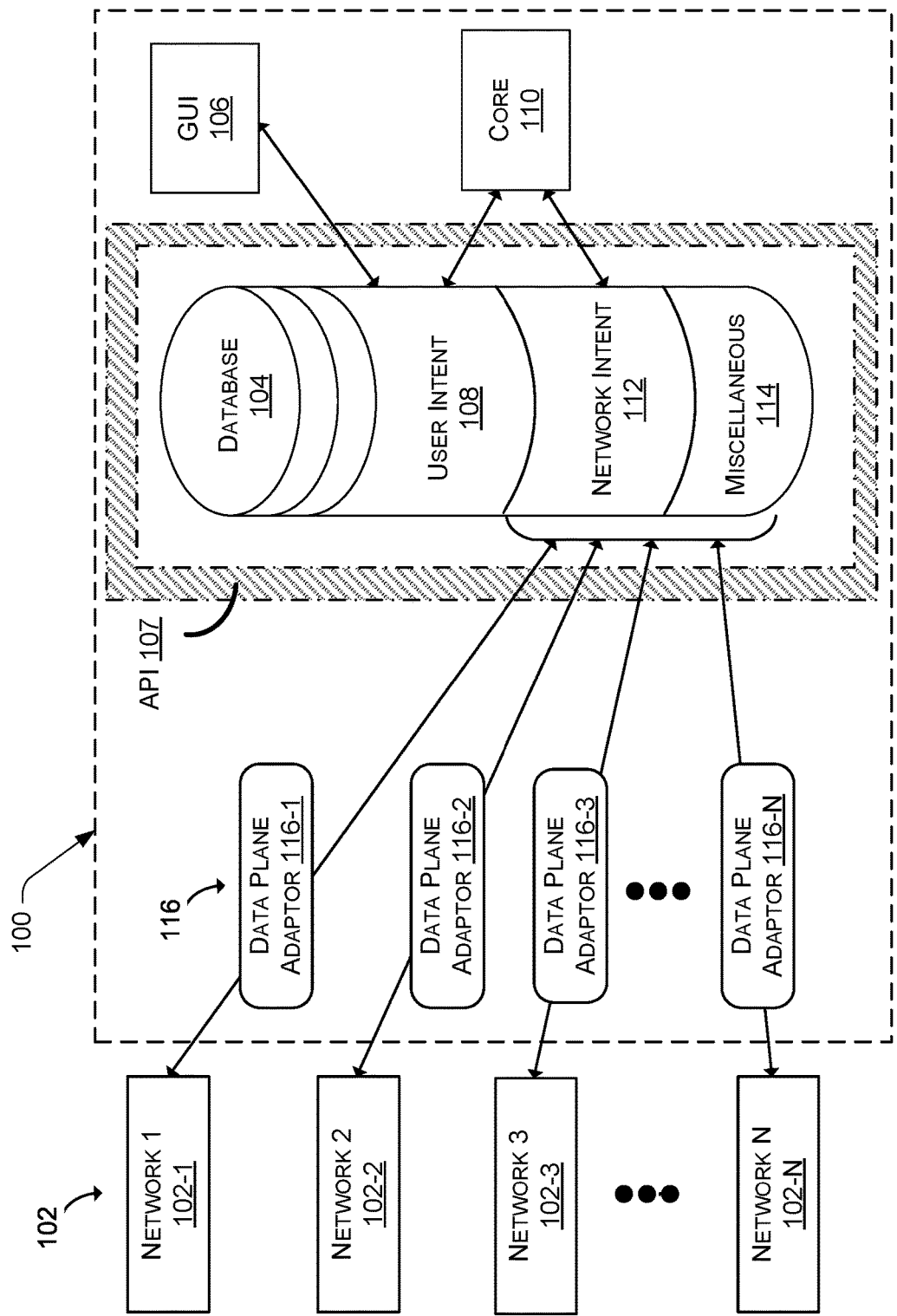
FIG. 1 is a diagram illustrating an embodiment of an enterprise network-to-network interconnect system that may be utilized to configure interconnection between a plurality of networks.

This disclosure describes methods and systems to externally manage network-to-network interconnect configuration data in conjunction with a centralized database subsystem. An example of the methods includes receiving and storing, in the centralized database subsystem, data indicative of user intent to interconnect at least a first network and a second network. The example method further includes, based at least in part on the data indicative of user intent, determining and storing, in the centralized database subsystem, a network intent that corresponds to the user intent. The example method further includes providing data indicative of the network intent from the centralized database subsystem to a first data plane adaptor, associated with the first network, and a second data plane adaptor, associated with the second network.

Additionally, the techniques described herein may be performed by a system and/or device having non-transitory computer-readable media storing computer-executable instructions that, when executed by one or more processors, performs the methods described herein.

EXAMPLE EMBODIMENTS

As network topologies become more virtual and opaque, tools to manage such networks from a higher level can be helpful. Furthermore, it may be useful for such tools to be cloud-based. For example, a method and system may be provided to perform automatic interconnection of different enterprise networks (for example, each located behind a public cloud or a private SD-WAN), including translating user intent into network intent. A user intent may be a high-level description provided by a user, such as by a network administrator via a graphical user interface, of a network interconnection. The system and method may determine, based at least in part on the user intent, a network intent that corresponds to the user intent. The network intent may include, for example, a lower-level description of how two or more networks may be configured to accomplish the user intent, such as tunnel configuration parameters, security parameters and IP addresses. The system and method may provide data indicative of the network intent to data plane adaptors of the system, and the data plane adaptors may negotiate to accomplish the network intent.

The user intent, network intent and parameters of the negotiation may be stored into and retrieved from a centralized database subsystem, such as a centralized data store configured as a key-value store. With this centralized database subsystem design, an Enterprise Network-to-Network Interconnect (ENNI) system may be modularized. The modules of the system may be executed on any computing device with a network access to the centralized database subsystem and can be scaled as required and/or desired. Processes instantiating the modules may execute as services in an on-premises cloud and/or a public cloud (e.g., such as virtual machines and/or containers).

A system may capture user intent via a graphical user interface (GUI). The GUI may guide the user to define the user intent, and the GUI may be configured to capture the user intent and cause the system (e.g., via an application program interface, or API, to the system) to save the user intent into the centralized database system. In some examples, the GUI is an HTML or other web-format front-end, such that the GUI may be accessible to users via a web browser.

The centralized database subsystem, including the user intent saved therein, may be accessible to other modules of the ENNI. For example, the user intent may be accessible to other modules executing as services in an on-premises cloud and/or a public cloud. Furthermore, the user may describe the user intent at a high level, and other modules of the system may process the described user intent to determine a network intent that is a lower-level description that may be, for example, suitable for consumption by networks of the enterprise (e.g., via an API provided by the networks) to configure an interconnection corresponding to the described user intent. The system may determine the network intent even if the described user intent does not include detailed enough description suitable for consumption by the networks to configure an interconnection.

In some examples, a module that processes user intent to determine a network intent polls a centralized database subsystem for the presence of new or modified user intent. When the module determines that new or modified user intent is present, the module determines the network intent that corresponds to the new or modified user intent. By polling for the presence of new or modified user intent in the centralized database subsystem, the system may recognize that user intent has been captured. The module may determine the network intent automatically, without involvement or intervention by a user and, thus, a user need not have detailed knowledge of network capabilities.

Furthermore, if the module determines that the user intent cannot be directly translated into a network intent, the module may determine alternative network intent to accomplish objectives of the user intent. This may include, for example, determining that two networks to be interconnected according to the user intent support different tunnel types or have an overlapping addressing space. This may further include, for example, determining an alternative network intent that includes an additional network that can "bridge" the capabilities of the two networks to be interconnected according to the user intent.

With the network intent determined, one or more data plane adaptors may, based at least in part on the network intent, configure a network to accomplish the network intent. This may include, for example, data plane adaptors polling the centralized database subsystem and becoming aware of new or updated network intent in the centralized database subsystem. Based on the new or updated network intent, a data plane adaptor may call a network's API with appropriate parameters to cause the network to implement the network intent. The networks may communicate with each other via the data plane adaptors and the centralized database subsystem, exchanging information via one or more negotiation objects to negotiate accomplishment of the network intent.

In one example, a data plane adaptor that receives a negotiation object from a first network may store the negotiation object in the centralized database subsystem. A data plane adaptor associated with a second network may recognize (e.g., by polling the centralized database subsystem), that a negotiation object for it has been stored in the centralized database subsystem. The data plane adaptor associated with the second network may retrieve the negotiation object from the centralized database subsystem and act upon the negotiation object accordingly, to thus achieve the network intent. The first network (and the second network, for that matter) may need to write more than one negotiation object to the centralized database subsystem such that, in the manner just described, negotiation objects are exchanged between the first network and the second network via the centralized database subsystem, to achieve a link that corresponds to the network intent.

For example, the link may be a tunnel between the first network and the second network, and the negotiation objects may be JavaScript Object Notation (JSON) or other objects that are passed between the first network and the second network, via the centralized database subsystem, with the first network and the second network updating a negotiation object until parameters of a tunnel between the first network and the second network have been negotiated. The parameters may include, for example, key exchange version, IP address and cryptography version. The object may also include a status field, such as for each parameter of the tunnel, to indicate a status of the negotiation of that parameter.

In some examples, the system includes a conflict resolution module. For example, it may be that, in some instances, it is not possible to form a link between the first network and the second network, even though this is the network intent. This may be, for example, because the first network and the second network have no common connection kind. The conflict resolution module may operate to determine an alternative interconnection configuration to connect the first network and the second network, such as via a third network that has a connection kind in common with a connection kind of the first network and a connection kind in common with a connection kind of the second network. In such an example, the conflict resolution module may suggest forming a link from the first network to the third network and from the third network to the second network.

The conflict resolution module may modify the network intent in the centralized database subsystem to correspond to the alternative interconnection configuration. A module of the system, based on the modification to the network intent in the centralized database subsystem, may modify the user intent to correspond to the modified network intent. A user interface, such as a graphical user interface, may update a display to correspond to the modified user intent.

In some examples, the system may be configured to not provide the modified network intent to data plane adaptors until some action is taken, such as confirmation provided via a user interface and indicated in the centralized database subsystem. For example, the modified network intent may be indicated in the centralized database subsystem by the conflict resolution module as tentative or suggested, and then the user interface may indicate in the centralized database subsystem that the modified network intent is approved. A module of the system may provide the approved modified network intent to one or more data plane adaptors, to cause the networks to negotiate one or more links based on the modified network intent.

The described methods and systems may, in some examples, operate to achieve a network intent that corresponds to interconnecting more than two networks. For example, the data plane adaptors for the networks may negotiate among themselves using negotiation objects stored in and retrieved from the centralized database subsystem, without a direct and/or dedicated two-end communication pathway between the negotiating data plane adaptors. In some circumstances, third-party software components with access to the centralized database subsystem may participate in the negotiations as well.

In some examples, the centralized database subsystem provides multi-tenancy support for interconnecting networks. For example, different users may be given different accesses to see, test or change interconnection configuration elements, while access to other configuration elements may be denied. In some examples, any user may be allowed to create its own configuration elements and may also be allowed to configure them. In some examples, in order to ease the configuration process, users may be given access to stored credentials such as a registered Azure account or a stored Meraki API key. In some examples, users may additionally grant access to groups or specific users to create objects. Access rights granted may include, for example, right to "see," to "connect to" and/or to "modify."

In some examples, the methods and system for network interconnection are not strongly tiered. This may, for example, allow connections between networks that are operated by different users, groups or even companies. Using the centralized database subsystem and/or a cloud-based service, networks may be interconnected if appropriate controlling entities agree to do so.

The techniques described herein may be performed by a system and/or device having non-transitory computer-readable media storing computer-executable instructions that, when executed by one or more processors, performs the methods described herein.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 is a diagram illustrating an embodiment of an ENNI system 100 that may be utilized to configure interconnection between a plurality of networks Network 1 102-1, Network 2 102-2, Network 3 102-3, ..., Network N 102-N (sometimes individually generically referred to merely as 102). The ENNI system 100 utilizes a centralized database subsystem. Referring to the FIG. 1 embodiment, the centralized database subsystem is the ENNI database 104. The ENNI database 104 may be organized, for example, as a key-value-store (KVS). In some examples, the ENNI database 104 may be replicated across different nodes for consistency. The ENNI database 104 may operate as a centralized database subsystem for the ENNI system 100, such that the ENNI database 104 is utilized for communication among various modules of the ENNI system 100.

The ENNI system 100 includes an ENNI GUI 106. In one example, the ENNI GUI 106 provides an HTML front end that interacts with an ENNI API server 107 and the ENNI API server 107 may interface with the ENNI database 104. The ENNI GUI 106 is just one example input/output user interface, and other types of input/output user interfaces may be provided instead or in addition.

The ENNI GUI 106 may, in operation, allow a user to provide an indication of "user intent" for interconnecting two or more of the networks 102. The provided user intent is stored in a user intent portion 108 of the ENNI database 104. The user intent portion 108 may not be a separate physical portion of the ENNI database 104 but, rather, indicates a data category of data stored in the ENNI database 104. User intent includes, for example, high-level intent, such as. "connect network A to network B."

In one example, the user intent stored in the user intent portion 108 may include node objects, attachments and connections. For example, a node object may represent an "SD-WAN endpoint." Examples of SD-WAN endpoints include a Meraki device, a Viptela vEdge device and a public-cloud IP Security (IPSec) gateway. A node object may include an indication of a node type, an id and adapter-specific configuration information. The adaptor-specific information may include, for example, credentials to access a Meraki device API. The ENNI database 104 may also contain a directory of different node types along with a corresponding indication of capabilities for each node type. The indication of capabilities may include, for example, an indication of which attachment types are supported by the node type.

Attachment objects stored in the user intent portion 108 may, for example, represent an "SDWAN interface." Thus, for example, an attachment object may be identified by an attachment type, an id, the id of the node to which it is attached, and some adapter-specific configuration information. For example, the adaptor-specific configuration information may include IP addresses and an interface name. The ENNI database 104 may also include, for example, an indication of different attachment types along with a corresponding indication of capabilities for each attachment type. The indication of capabilities may include, for example, an indication of which tunnel types are supported by the attachment type.

Connection objects stored in the user intent portion 108 may, for example, represent an "SDWAN interconnect," which indicates an intent to connect two different attachments. Thus, for example, a connection object may be identified by a connection type, an id, and the two id's of the attachments to be connected. As a user intent, a connection object can exist in the user intent portion 108 for a connection that may be unrealizable in practice. For example, the connection object may represent a connection between two SDWANs that support different tunnel types and/or a connection between two networks with overlapping address spaces. For connection objects that exist in the user intent portion 108 for connections that are unrealizable in practice, a conflict resolution engine, discussed later, may be provided to assist the user in achieving a purpose of the user intent.

An indication of a node in the user intent portion 108 may represent a generic "advertised route." In one example, the concept of a route extends classic IPv4/IPv6 routes, also embedding "named routes." An example of a named route is a DNS-based route, such as "traffic to foobar.com." An example of a named route may include a cloud-application-specific routes, such as "traffic to Office365." When a network is advertised by a node, this may indicate that traffic for this network should eventually be directed to that node. Thus, a network may, in the network intent sense, be thought of as an advertisement, as in "this address or service should be directed to this node." In one example, a network indication may include an id, a network kind (such as IP, named-based or cross-connect), a unique attachment id corresponding to the advertiser of the network, and some internal content (such as an actual IP prefix or a domain-name). While network indications may be derived from user intent (e.g., by manual configuration/designation by a user), network indication may also be automatically retrieved by adapters and pushed back to the user intent portion 108 of the ENNI database 104. For example, a network indication may be dynamically acquired by a routing protocol. A network object may also encode the source of the intent (i.e., manual or automatic) in order to track this behavior.

Referring still to the FIG. 1 example ENNI system 100, an ENNI core 110 is provided. The ENNI core 110, based on new and/or updated user intent in the user intent portion 108, determines corresponding network intent. The ENNI core 110 stores the determined network intent in a network intent portion 112 of the ENNI database 104. In one example, the network intent stored in the network intent portion 112 may include data plane adaptor objects, interface objects and tunnels objects.

A data plane adaptor object of network intent may represent an instance of a data plane adaptor. Each ENNI data plane adaptor 116-1, 116-2, 116-3 through 116-N (sometimes individually generically referred to merely as 116) provide an interface between the ENNI system 100 and a respective network 102. The data plane adaptor object may represent an actual executing instance of an ENNI data plane adapter 116. In another example, a data plane adaptor object may correspond to a non-existing node, such as in a situation in which invalid credentials have been provided. In one example, a data plane adaptor object may include an indication of an id, an id of an underlying node, and a runtime status. Data plane adaptors 116 are discussed in greater detail below.

An interface object of network intent may represent an actual network interface. This is in contrast to an attachment object of user intent, which is a "plug" onto which the user can express intent to attach a connection. For example, an attachment may be attached to a node, expressing the user intent of creating an interface with a particular configuration, but such an interface might fail to be created. Additionally, an attachment can potentially correspond to multiple interfaces. An interface object may include, for example, an id, an id of an underlying attachment, an id of an underlying data plane adaptor, and a runtime status.

A tunnel object of network intent may represent an actual tunnel between two attachments. (In some examples, links other than tunnels may be indicated in the network intent portion 112 of the ENI database 104.) This is in contrast to a connection object of user intent, which may express an intent to connect two attachments and which might not represent a valid link. A tunnel object may represent a full, implementable, network intent of a tunnel. A tunnel object may include, for example, an id, an id of an underlying connection object, a tunnel kind, and some tunnel-specific configuration information such as pre-shared keys, protocol version, encryption types and IP addresses.

A route object of network intent may represent an actual routing information base (RIB) entry, such as indicated that packets destined, for example, to the IP prefix a.b.c.d/e (or similarly with IPv6) reaching a given node should be forwarded to a given interface. As such, a prefix may be described by an id, an id of a corresponding ENNI data plane adaptor instance and of a corresponding interface, an actual IP prefix represented by the object, and a runtime status. Routes objects may be configured by an RIB engine (part of the ENNI core 110, as described below), in such a manner that the user intent described by the network objects is satisfied, that is, that traffic destined to a given network eventually reaches the corresponding node.

In some examples, the ENNI database 104 includes other miscellaneous objects, in a miscellaneous portion 114. For example, the ENNI database 104 may include ENNI data plane adaptor runtime statuses which, for example, can provide a backup such as if an ENNI data plane adaptor is restarted or is moved to another server, as described below. Another example miscellaneous object is per-tunnel negotiation information, through which two adaptors can interact when negotiating a tunnel or other link configuration. Another example miscellaneous object is a proposed solution to an unrealizable user intent. Thus, for example, such a miscellaneous object can be a source for presenting a proposed solution to a user via the ENNI GUI 106.

The ENNI API server 107 may provide, for example, an HTTP REST API that provides access to the different elements of the contents of the ENNI database 104. For example, for each user intent object (node, attachment, connection), a set of REST calls (HTTP GET, POST, PUT, DELETE) may be provided to interact with those objects. For each network intent object (tunnels, networks), in some examples, only read-only (not write) access is provided, such as through a REST HTTP GET call.

The ENNI core 110 may be comprised of a tunnel engine and an RIB engine. The tunnel engine may convert connection user intents into tunnel network intents. In some examples, the tunnel engine monitors the user intent portion 108 of the ENNI database 104 for appearance of new connection objects. When a new connection object appears, the tunnel engine may check that the two attachments to which the connection object is bound are valid. This may include checking that the two attachments are existing, attached to an existing node, are not bound to any other connection, are in admin-up state or in a running-down state, and this may also include checking that the nodes to which those attachments are bound are valid, such as being existing, attached to a running data plane adaptor, and in a non-failed status.

The tunnel engine may also check that, among the connection kinds supported by the first attachment and the connection kinds supported by the second attachment, there is at least one connection kind that is supported by both. If there are more than one supported connection kind, the tunnel engine may select one according to an operator-specified ranking.

If the tunnel kind selection succeeds, the tunnel engine may push a tunnel object to the network intent portion 112 of the ENNI database 104, with the selected kind and bound to the connection object under consideration. If the tunnel kind selection does not succeed, the tunnel engine may mark the status of the connection, in the user intent portion 108 of the ENNI data base 104, as failed. The tunnel engine may then initiate a conflict resolution procedure, described later.

In addition, the tunnel engine may monitor the network intent portion 112 for updates in statuses of tunnel objects. For example, such updates may be written into the network intent portion 112, by the data plane adapters. When the tunnel engine determines a tunnel object update has been written into the network intent portion 112 of the ENNI database 104, the tunnel engine may update corresponding connection and attachment objects. Similarly, when the tunnel engine detects a tunnel object has been deleted, the tunnel engine may delete a corresponding connection object in the ENNI database 104.

As discussed above, the tunnel engine may convert user intent into network intents. This may be done by, for example, the tunnel engine monitoring the ENNI database 104 for appearance of node and attachment objects, and the tunnel engine may create corresponding data plane and interface objects in the ENNI database 104. As another example, the tunnel engine may monitor the ENNI database 104 for appearance of network objects, and the tunnel engine may create corresponding route objects in the ENNI database 104. As another example, the RIB engine may propagate routes, by running a breadth-first-search algorithm to propagate route objects along connection objects until all the connected-components containing the original network object are explored, such that the route is fully propagated. For example, for each interface i visited during this process, the RIB engine may retrieve the (previously-visited) interface j which is connected to interface i. The RIB engine may store a route object in the ENNI database 104 associated with interface i and indicate interface j as a next-hop. Then, the RIB engine may add all not-yet-visited interfaces connected to i to the list of interfaces to be visited, and the process continues.

Additionally, the RIB engine may monitor the ENNI database 104 for deletion of network objects, in which case the RIB engine deletes corresponding route objects from the ENNI database 104. Similarly, if connection objects are updated in the ENNI database 104 (for example, such that the network graph has changed), the RIB engine may recompute the route propagation.

Still referring to FIG. 1 and turning to the ENNI data plane adapters 116, each ENNI data plane adaptor may be specific to each network (e.g., SDWAN) with which ENNI system 100 can interact. Common features of the ENNI data plane adapters 116 may include the ability to monitor the ENNI database 104 for appearance of new tunnel objects, such that one of two endpoints represented in a newly-appeared tunnel object can be processed by an ENNI data plane adapter 116. Another common feature of ENNI data plane adapters 116 may include the ability to initiate a negotiation with another ENNI data plane adapter 116, such as an ENNI data plane adaptor 116 corresponding to a second endpoint represented in the newly-appeared tunnel object, to achieve agreed-upon tunnel parameters, as described below.

Another common feature of ENNI data plane adapters 116 may include an ability to act in an appropriate manner upon conclusion of a tunnel negotiation process. This may include, upon failure of the negotiation, the ENNI data plane adapter 116 informing the tunnel engine by storing a failed status to the ENNI database 104 for that tunnel object, and possibly aborting the tunnel negotiation process. Upon success of a tunnel negotiation, the ENNI data plane adaptor may interface with an appropriate network API to initiate creation of a tunnel described by the tunnel object.

Furthermore, another common feature of ENNI data plane adapters 116 may be the ability to, upon failure of a tunnel establishment (for example, as indicated by a network via a network API), store a failed status to the ENNI database 104 for that tunnel object, and abort the tunnel negotiation process. Upon success of the tunnel establishment (for example, as indicated by a network via a network API), the ENNI data plane adaptor may store a success status to the ENNI database 104 for the tunnel object corresponding to the established tunnel.

Another feature of an ENNI data plane adaptor may be the ability to monitor the status of a tunnel, through access to a network API. In the case of a failure, for example, the ENNI data plane adaptor may store a failed status to the ENNI database 104 for that tunnel object, and abort processing related to the tunnel. The ENNI data plane adaptor may also have the ability to monitor the ENNI database 104 to determine a tunnel object has disappeared from the ENNI database 104, in which case the ENNI data plane adapter 116 may call the corresponding network API to request deletion of that tunnel.

Furthermore, an ENNI data plane adapter 116 may also have the ability to save, in the ENNI database 104, parameters corresponding to the running state of the tunnel accessed as an adapter runtime status object, for example, via an API of the network. If the ENNI data plane adapter 116 needs to be restarted, it may be able to be configured with the current status using the saved adapter runtime status object.

Additionally, an ENNI data plane adapter 116 may fetch routing information from a network to which the ENNI data plane adapter 116 is bound and save the routing information in the ENNI database 104 as a network object.

As discussed above, upon initiation of a new tunnel by an ENNI data plane adapter 116, the ENNI data plane adapters 116 forming the two endpoints of the tunnel may operate to negotiate an agreement on the parameters for creation of the tunnel. The ENNI data plane adapters 116 may exchange a negotiation object through the ENNI database 104. The negotiation object may be a JSON object whose fields are updated by the two ENNI data plane adaptors 116 as the negotiation proceeds.

In the tunnel negotiation process, a master ENNI data plane adapter 116 may be elected via an offline procedure, such as by executing a static function on identifiers of the networks 102. The master ENNI data plane adapter 116 may be in charge of writing an initialized object for the negotiation into the ENNI database 104. The initialized object may comprise a number of fields upon which the two data plane adapters 116 may agree (for example, such as Internet Key Exchange, or IKE, version, IKE crypto algorithm, pre-shared keys, IP address of the master ENNI data adapter 116, and IP address of the slave ENNI data plane adapter 116). For each of these fields, the object may also include a status field.

In one example, a value of the status field is an integer between 1 and 4 representing the following status: 1. Uninitialized; 2. Value proposed; 3. Value accepted; 4. Value refused. Each data plane adapter 116 may implement a negotiation schema that describes when a negotiation has been taken to its end and, for each field, describes what action is to be taken depending on the value of the field, upon modification of this field by the other data plane adapter 116 in the negotiation.

During the tunnel negotiation, each ENNI data plane adaptor 116 participating in the negotiation may, for example, check a value/status being negotiated against a static value or against a callback function. Each ENNI data plane adapter 116 may modify the value or status of an arbitrary field, according to a fixed value or to a callback function. As one example, the negotiation schema implemented by an ENNI data plane adapter 116 may indicate that if the field PreSharedKey has status 2 (proposed) and length smaller than 10, then the new value of the field PreSharedKey should be updated to that of the return value of a callback function (which may, for example, return a random 20-byte key), and that its status should be updated to 4 (refused). An ENNI data plane adapter 116 may implement a schema by polling the ENNI database 104 for modification of a negotiation object, updating the object according to the negotiation schema being implemented by the ENNI data plane adapter 116, and storing the negotiation object back into the ENNI database 104.

As described above, if a user intent corresponds to two networks for which there is no common connection kind, the tunnel engine may report a failed status for the corresponding connection object. The tunnel engine may start a conflict resolution procedure. For example, if it is not possible (or perhaps practical) to connect network A and B directly as indicated in a user intent, it may be possible to connect network A to network C and network C to network B, where C is a third-party network that has the capability to connect to both A and B.

To achieve such a connection via a third-party network, a conflict resolution engine may browse all network kinds (in a network kind directory, as described above) to find a network that supports both at least one connection kind supported by a first network of represented by the user intent and one connection kind of a second network represented by the user intent. For each of the network kinds found to be supported by the first network and the second network, the conflict resolution engine may list all networks of this kind. If there is no such network, the conflict resolution engine may create a virtual network, with an empty configuration. For each of the networks found this way (virtual or not), the engine may create one solution object, which comprises of (i) the first network, (ii) one attachment and one connection with the right kind to reach the first network, and (iii) one attachment and one connection with the right kind to reach the second network. The conflict resolution engine may then store a proposed solution object into the ENNI database 104 including the solution objects.

In one example, the ENNI GUI 106 reads the proposed solutions object from the ENNI data store and displays the proposed solutions object to a user, such as graphically or in a dialog box. In response to a user selection of one of the solutions, the ENNI GUI 106 processes the selection to generate a user intent. This processing may include generating queries to the user for additional information for the user intent, such as configuration information. The ENNI GUI 106 stores the user intent into the ENNI database 104, from which a network intent may be generated, tunnel negotiation carried out, and so on.

Figure 2:
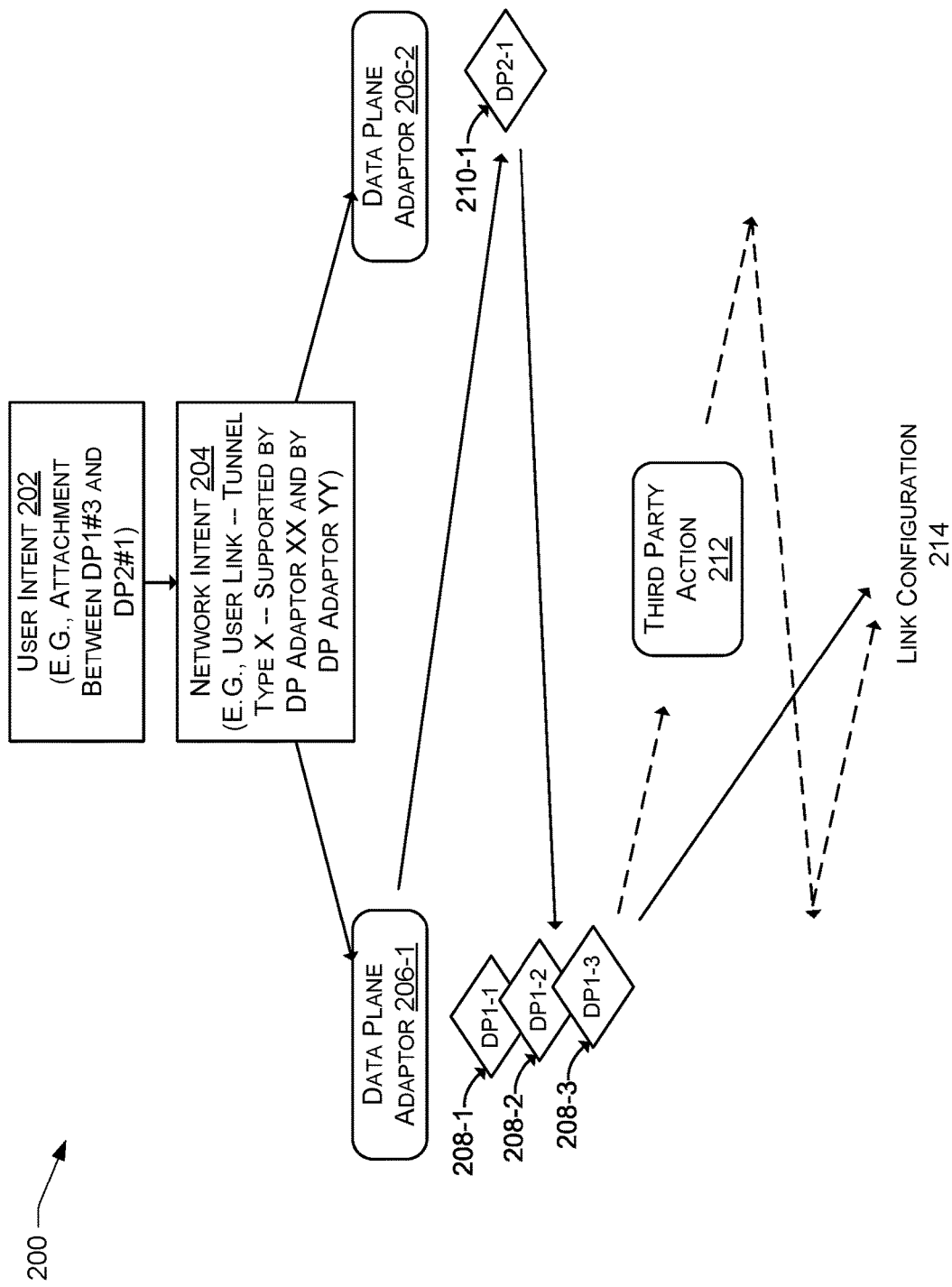
FIG. 2 schematically illustrates a data-centric example of a tunnel (or other link) negotiation.

FIG. 2 schematically illustrates a data-centric example of a tunnel (or other link) negotiation in greater detail. First, at least in part from the user intent 202 (which has been stored into a centralized database subsystem, such as the ENNI database 104), a network intent 204 is determined. For example, using the FIG. 1 example ENNI system 100, the ENNI core 110 may determine the network intent 204 at least in part from the user intent 202. In the example, the user intent 202 may indicate an attachment between a node #3 of a network 1 and a node #1 of a network 2. The network intent 204 may indicate a user link of tunnel type X, which is supported by ENNI data plane adaptor 206-1 and data plane adaptor 206-2.

Referring still to FIG. 2, as a result of the ENNI data plane adaptor 206-1 and the data plane adaptor 206-2 performing a negotiation, such as according to a negotiation schema, negotiation objects DP1-1 208-1, DP1-2 208-2 and DP1-3 208-3 are communicated from the data plane adaptor 206-1. As described above, the negotiation objects DP1-1 208-1, DP1-2 208-2 and DP1-3 208-3 may be communicated from the data plane adaptor 206-1 to a centralized database subsystem such as the ENNI data base 104. Similarly, negotiation object DP2-1 210-1 may be communicated from the data plane adaptor 206-2. In some circumstances, a third-party 212, such as a user or some other entity, may also read and store negotiation objects. This may occur, for example, when the ENNI data plane adaptor 206-1 and the ENNI data plane adaptor 206-2 cannot agree on the configuration of a tunnel or other link. Once the configuration of the tunnel or other link is agreed, the link configuration 214 may be used to configure and operate the tunnel or other link. The link configuration 214 may, for example, be written into a centralized database subsystem such as the ENNI database 104.

Figure 3:
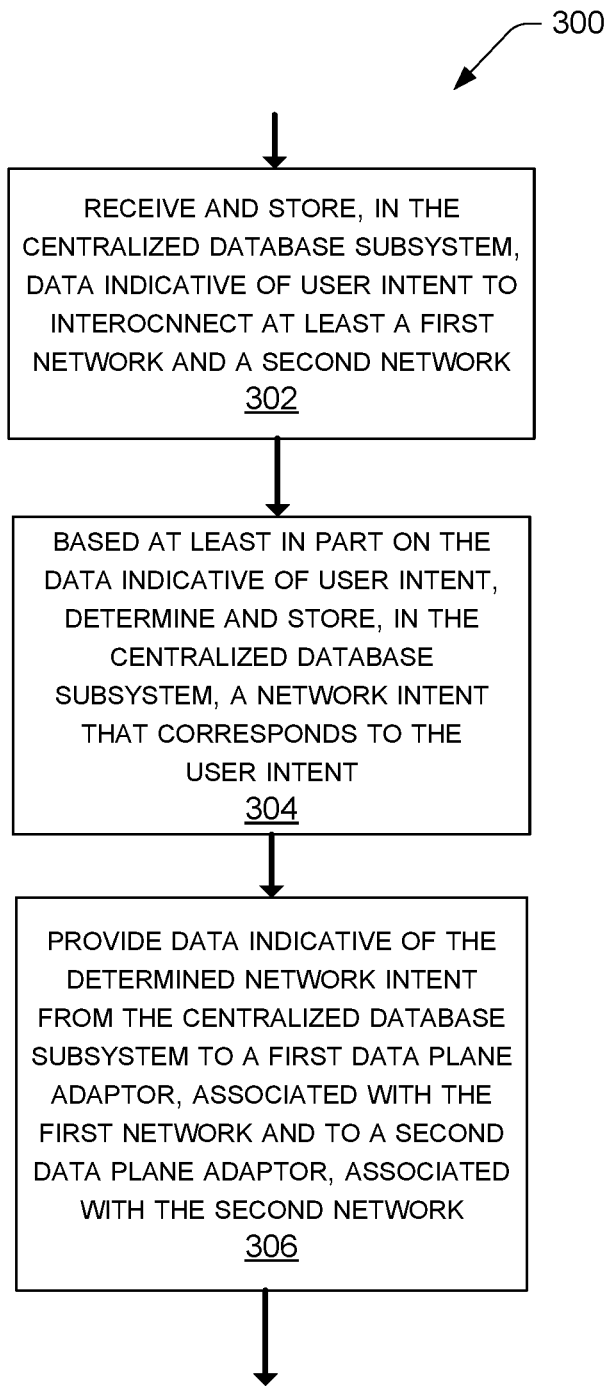
FIG. 3 is a flowchart illustrating an example process to initiate an enterprise network-to-network interconnection.

FIG. 3 is a flowchart illustrating an example process 300 to initiate an enterprise network-to-network interconnection, such as to interconnect one of the networks 102 with another one or more of the networks 102. At 302, a processor receives and stores, in a centralized database subsystem, data indicative of user intent to interconnect at least a first network and a second network. For example, the data indicative of user intent may be provided by a user interface such a graphical user interface, with which a user is interacting. In some examples, the user provides a high-level indication of the user intent, such as "connect network A to network B," and the user interface provides, for storage in the centralized database subsystem, the data indicative of user intent corresponding to the high-level indication provided by the user.

At 304, a processor determines and stores, in the centralized database subsystem, a network intent that corresponds to the user intent. The network intent is based, at least in part, on the data indicative of the user intent. For example, the network intent may include a lower-level network interconnect configuration that is suitable for consumption by an API of a network. In one example, the network intent may be such as "create an IPSec tunnel between node 1.2.3.4 and 5.6.7.8 with IKE parameters x,y,z and pre-shared-key foobar."

At 306, data indicative of the determined network intent is provided from the centralized database subsystem to at least a first data plane adaptor, associated with the first network, and a second data plane adaptor, associated with the second network. It is then the role of the controllers associated with the first network and the second network to instantiate an actual network configuration to realize the network intent. This may include, for example, creating network interfaces, initiating tunnels, and configuring routing tables. This may also include, for example, a process by a controller of the first network, for example, to negotiate with a controller of the second network such that both networks may be appropriately configured for interconnection.

Figure 4:
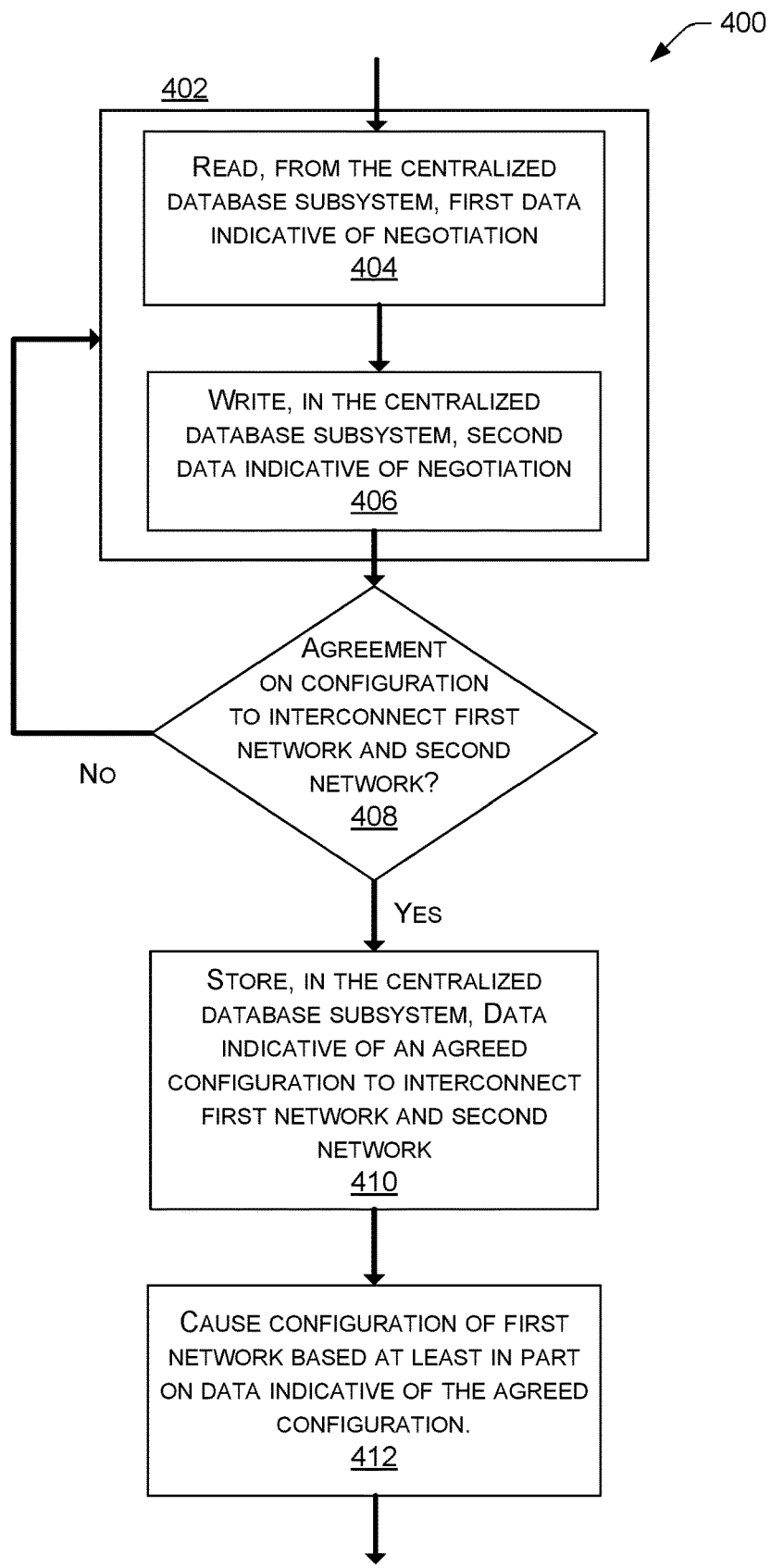
FIG. 4 is a flowchart illustrating an example process 400 for a first data plane adaptor to negotiate an interconnection between a first network, with which the first data plane adaptor is associated, and a second network.

FIG. 4 is a flowchart illustrating an example process 400 for a first data plane adaptor to negotiate an interconnection between a first network, with which the first data plane adaptor is associated, and a second network. In the FIG. 4 example, prior to 402, first data indicative of the negotiation has been stored into the centralized database subsystem. This may have been, for example, as a result of a data plane adaptor associated with the second network having stored the first data into the centralized database subsystem.

Operation 402 includes sub-operations 404 and 406. At 404, a processor reads, from the centralized database subsystem, data indicative of the negotiation. For example, the data read may include one or more tunnel negotiation objects, that includes per-tunnel negotiation information. In some examples, the interconnection being negotiated are one or more links that are other than tunnels.

At operation 406, the processor writes, in the centralized database subsystem, data indicative of the negotiation. In some examples, the data written includes negotiation information proposed by the first network adaptor. In addition or alternatively, the data written may include an indication of acceptance of some or all of the data read.

At operation 408, if there is not agreement on a configuration to interconnect the first network and the second network, the processor returns to operation 406, at which point the processor may read, from the centralized database system, data indicative of the negotiation at 404. Or the processor may write, at 406, to the centralized database subsystem, data indicative of the negotiation, without first reading from the centralized database subsystem at 404.

At operation 408, if there is agreement on a configuration to interconnect the first network and the second network, the processor proceeds to operation 410, at which the point the processor stores, in the centralized database subsystem, data indicative of an agreed configuration to interconnect the first network and the second network. At 412, the processor causes the first network to be configured based at least in part on the data indicative of the agreed configuration. This may include, for example, accessing a controller of the first network using an API provided by the controller.

Figure 5:
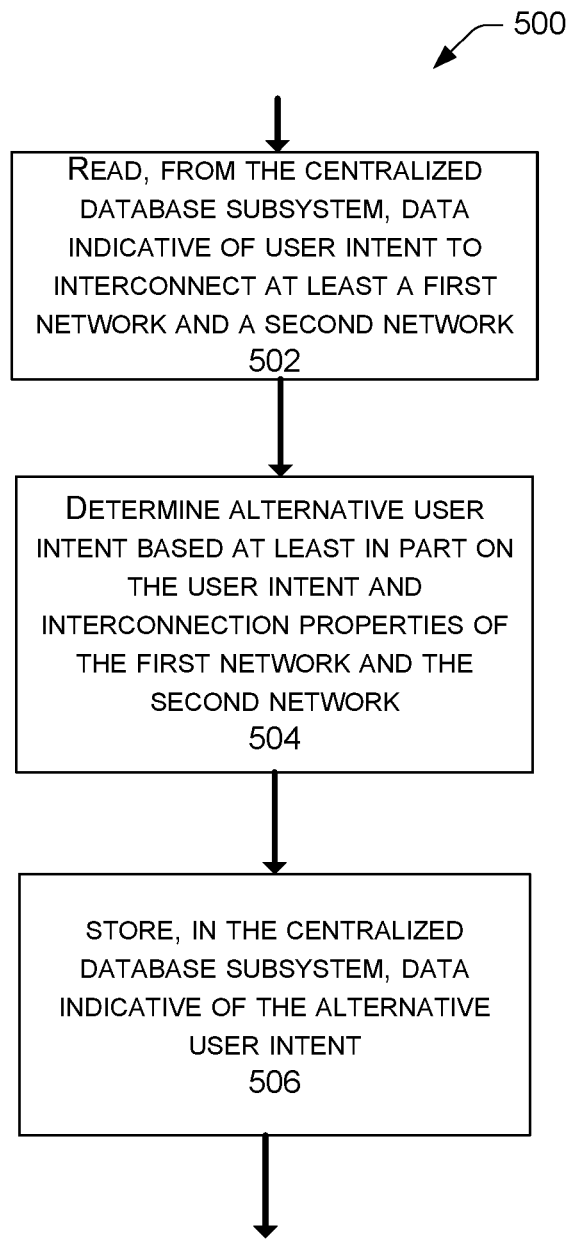
FIG. 5 is a flowchart illustrating an example process to resolve a conflict present in a user intent.

FIG. 5 is a flowchart illustrating an example process 500 to resolve a conflict present in a user intent. At 502, a processor reads, from the centralized database subsystem, data indicative of user intent to interconnect at least a first network and a second network. As described above, the data indicative of user intent may have been stored in the centralized database subsystem as a result of a user interacting with a user interface. At 504, the processor determines an alternative user intent based at least in part on the read data and interconnection properties of the first network and the second network. For example, a network intent may have been determined based at least in part on the data indicative of user intent read from the centralized database subsystem. The network intent may have been determined to be unrealizable based, for example, on the first network and the second network not having the ability to be configured to interconnect.

In some examples, the alternative user intent is determined by first determining an alternative network intent that is realizable and that accomplishes an objective of the user intent (e.g., to interconnect the first network and the second network) using one or more additional networks. The alternative user intent may have been determined based on the alternative network intent.

At 506, the processor stores, into the centralized database subsystem, data indicative of the alternative user intent, from which a network intent may be determined and, further, one or more links configured based on the determined network intent.

Figure 6:
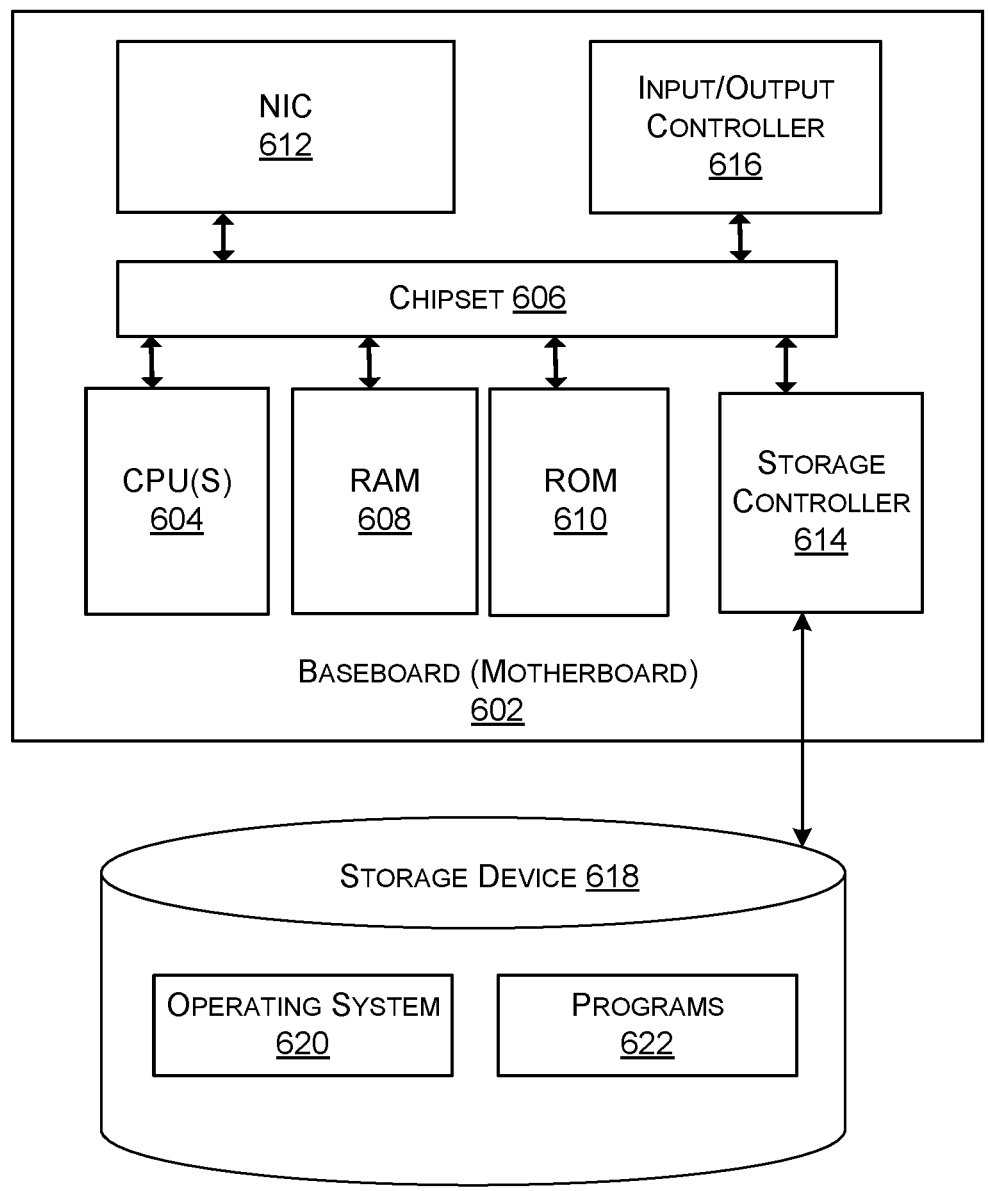
FIG. 6 illustrates an example computer architecture for a computer capable of executing program components for implementing functionality of an enterprise network-to-network interconnect system.

FIG. 6 illustrates an example computer architecture for a computer 600 capable of executing program components for implementing the functionality described above. The computer architecture shown in FIG. 6 illustrates an architecture of a server computer, workstation, desktop computer, laptop, tablet, network appliance, e-reader, smartphone, network switch, or other computing device, and can be utilized to execute any of the software components presented herein. The computer 600 may, in some examples, correspond to a network infrastructure device discussed herein.

The computer 600 includes a baseboard 602, or "motherboard," which may be a printed circuit board to which a multitude of components or devices can be connected by way of a system bus or other electrical communication paths. In one illustrative configuration, one or more central processing units ("CPUs") 604 operate in conjunction with a chipset 606. The CPUs 604 can be, for example, standard programmable processors that perform arithmetic and logical operations necessary for the operation of the computer 600.

The CPUs 604 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 606 provides an interface between the CPUs 604 and the remainder of the components and devices on the baseboard 602. The chipset 606 can provide an interface to a RAM 608, used as the main memory in the computer 600. The chipset 606 can further provide an interface to a computer-readable storage medium such as a read-only memory ("ROM") 610 or non-volatile RAM ("NVRAM") for storing basic routines that help to startup the computer 600 and to transfer information between the various components and devices. The ROM 610 or NVRAM can also store other software components necessary for the operation of the computer 600 in accordance with the configurations described herein. As illustrated in FIG. 6, the ROM 610 or NVRAM can also store portions of user intent, network intent and miscellaneous data. In other examples, the user intent, network intent and miscellaneous data may be stored elsewhere, such as in RAM 608.

The computer 600 can operate in a networked environment using logical connections to remote computing devices and computer systems through a network. For example, the chipset 606 can include functionality for providing network connectivity through a Network Interface Controller (NIC) 612, such as a gigabit Ethernet adapter. The NIC 612 can connect the computer 600 to other computing devices over a network. It should be appreciated that multiple NICs 612 can be present in the computer 600, connecting the computer to other types of networks and remote computer systems. In some instances, the NICs 612 may include at least one ingress port and/or at least one egress port. An input/output controller 616 may be provided for other types of input/output.

The computer 600 can be connected to a storage device 618 that provides non-volatile storage for the computer. The storage device 618 can store an operating system 620, programs 622, and data, for example. The storage device 618 can be connected to the computer 600 through a storage controller 614 connected to the chipset 606. The storage device 618 can include one or more physical storage units. The storage controller 614 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 600 can store data on the storage device 618 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 618 is characterized as primary or secondary storage, and the like. For example, the computer 600 can store information to the storage device 618 by issuing instructions through the storage controller 614 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 600 can further read information from the storage device 618 by detecting the physical states or characteristics of one or more particular locations within the physical storage units.

In addition to the storage device 618 described above, the computer 600 can have access to other computer-readable storage media to store and retrieve information, such as program modules, data structures, or other data, including user intent, network intent and miscellaneous data. It should be appreciated by those skilled in the art that computer-readable storage media is any available media that provides for the non-transitory storage of data and that can be accessed by the computer 600.

In some examples, an ENNI system such as the FIG. 1 system 100 may be executing on-premise or as a cloud-operated service. In some examples, different users are given different accesses to see, test or change configuration elements (nodes, attachments, connections, etc.) while access to other elements may be denied.

Any user may be allowed to create its own configuration elements, including being allowed to configure them. Users may be given access to stored credentials (like a registered Azure account or a stored Meraki API key). In some examples, a user may additionally grant access to groups or specific users to objects created by that user, and such access may include, for example, right to "see," "to connect to" and/or "to modify."

In some examples, an ENNI system is not strongly tiered and may allow configuration of connections between networks that are operated by different users, groups or even companies. With the use of the centralized database subsystem, networks may be able to be to interconnected if appropriate controlling parties agree to do so. This can provide additional value to an ENNI system configured as a cloud-based service.

Thus, for example, an ENNI system may allow for semi-automated interconnection of heterogeneous SD-WANs. By providing credentials to the different SD-WAN API that they own, a user can interact with a simple frontend to request creation of tunnels or other links between those SD-WANs and, as such, create an arbitrary graph between all networks. Creation of tunnels or other links may be facilitated by a key-value-store-based negotiation protocols (or based on other organizations of a centralized database subsystem) that permits automatic generation of parameters based, for example, on the highest capabilities of the two networks to be connected. When two nodes cannot be readily interconnected, a conflict resolution engine may enable interconnection of two networks in another way, such as via a third-party gateway.

In one aspect, the systems and methods thus described provides a framework enabling multi-SD-WAN and multi-cloud interconnectivity in a generic way. For example, the systems and methods may adopt a generic approach that avoids the "N/\2 interconnectivity problem." A single adapter may be used to connect a system, such as a cloud or SD-WAN, to any other system having compatible capabilities. A single adapter may be used for both multi-cloud and multi-SDWAN.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative of some embodiments that fall within the scope of the claims of the application.

What is claimed is:

1. A method performed by a cloud-managed service running in a cloud provider network, the method comprising:

receiving, at the cloud-managed service, first data indicative of user intent for the cloud-managed service to interconnect a first network and a second network, the user intent comprising a user description of the interconnect between the first network and the second network;

translating the user intent into a network intent that corresponds to the user intent, the network intent representing configuration details usable by data plane adaptors to configure the interconnect between the first network and the second network;

based at least in part on the network intent:

establishing a first connection with the first network and the cloud provider network;

establishing a second connection with the second network and the cloud provider network; and establishing the interconnect between the first network and the second network using the first and second connections and via the cloud provider network.

2. The method of claim 1, wherein the network intent includes a definition of a network configuration corresponding to the user intent.

3. The method of claim 1, wherein the translating of the user intent and the establishment of the first and second connections are performed by the cloud-managed service running on a virtual computing resource of a cloud provider network.

4. The method of claim 3, further comprising:

exposing a user interface (UI) on a device associated with a dashboard managed by the cloud-managed service, wherein the user intent is received at least partly via the UI associated with the dashboard that is managed by the cloud-managed service.

5. The method of claim 1, wherein the network intent comprises:

tunnel configuration parameters associated with at least one of the first connection or the second connection;

security parameters associated with at least one of the first connection or the second connection; and Internet Protocol (IP) addresses associated with the first network and the second network.

6. The method of claim 1, wherein:

the first network includes one of a group of networks comprising:

a Software-Defined Wide Area Network (SD-WAN);

a private data center network;

a virtual private network (VPN);

a public cloud network; or a security infrastructure-as-a-service network; and the second network includes a different one of the group of networks.

7. The method of claim 1, wherein:

the first connection is established using a first communication protocol;

the second connection is established using a second communication protocol;

the method further comprising:

receiving, at the cloud-managed service, communications received via the first connection in the first communication protocol;

translating the communications from the first communication protocol into the second communication protocol; and sending the communications in the second communication protocol via the second connection.

8. A cloud provider network, comprising:

one or more processors; and one or more non-transitory computer-readable media storing computer-executable instructions that, when executed by the one or more processors, cause the one or more processors to perform operations of:

receiving, at a cloud-managed service running in the cloud provider network, first data indicative of user intent for the cloud-managed service to interconnect a first network and a second network, the user intent comprising a user description of the interconnect between the first network and the second network;

translating the user intent into a network intent that corresponds to the user intent, the network intent representing configuration details usable by data plane adaptors to configure the interconnect between the first network and the second network;

based at least in part on the network intent:

establishing a first connection with the first network and the cloud provider network;

establishing a second connection with the second network and the cloud provider network; and establishing the interconnect between the first network and the second network using the first and second connections and via the cloud provider network.

9. The cloud provider network of claim 8, wherein the network intent includes a definition of a network configuration corresponding to the user intent.

10. The cloud provider network of claim 8, wherein the translating of the user intent and the establishment of the first and second connections are performed by the cloud-managed service running on a virtual computing resource of a cloud provider network.

11. The cloud provider network of claim 10, the operations further comprising:

exposing a user interface (UI) on a device associated with a dashboard managed by the cloud-managed service, wherein the user intent is received at least partly via the UI associated with the dashboard that is managed by the cloud-managed service.

12. The cloud provider network of claim 8, wherein the network intent comprises:

tunnel configuration parameters associated with at least one of the first connection or the second connection;

security parameters associated with at least one of the first connection or the second connection; and Internet Protocol (IP) addresses associated with the first network and the second network.

13. The cloud provider network of claim 8, wherein:

the first network includes one of a group of networks comprising:

a Software-Defined Wide Area Network (SD-WAN);

a private data center network;

a virtual private network (VPN);

a public cloud network; or a security infrastructure-as-a-service network; and the second network includes a different one of the group of networks.

14. The cloud provider network of claim 8, wherein:

the first connection is established using a first communication protocol;

the second connection is established using a second communication protocol;

the operations further comprising:

receiving, at the cloud-managed service, communications received via the first connection in the first communication protocol;

translating the communications from the first communication protocol into the second communication protocol; and sending the communications in the second communication protocol via the second connection.

15. One or more non-transitory computer-readable storage media storing computer-readable instructions that, when executed, instruct one or more processors to perform operations comprising:

receiving, at a cloud-managed service running on a cloud provider network, first data indicative of user intent for the cloud-managed service to interconnect a first network and a second network, the user intent comprising a user description of the interconnect between the first network and the second network;

translating the user intent into a network intent that corresponds to the user intent, the network intent representing configuration details usable by data plane adaptors to configure the interconnect between the first network and the second network;

based at least in part on the network intent:

establishing a first connection with the first network and the cloud provider network;

establishing a second connection with the second network and the cloud provider network; and establishing the interconnect between the first network and the second network using the first and second connections and via the cloud provider network.

16. The one or more non-transitory computer-readable storage media of claim 15, wherein the network intent includes a definition of a network configuration corresponding to the user intent.

17. The one or more non-transitory computer-readable storage media of claim 15, wherein the translating of the user intent and the establishment of the first and second connections are performed by the cloud-managed service running on a virtual computing resource of a cloud provider network.

18. The one or more non-transitory computer-readable storage media of claim 17, the operations further comprising:

exposing a user interface (UI) on a device associated with a dashboard managed by the cloud-managed service, wherein the user intent is received at least partly via the UI associated with the dashboard that is managed by the cloud-managed service.

19. The one or more non-transitory computer-readable storage media of claim 15, wherein the network intent comprises:

tunnel configuration parameters associated with at least one of the first connection or the second connection;
security parameters associated with at least one of the first connection or the second connection; and
Internet Protocol (IP) addresses associated with the first network and the second network.

20. The one or more non-transitory computer-readable storage media of claim 15, wherein:
the first connection is established using a first communication protocol;
the second connection is established using a second communication protocol;
the operations further comprising:
receiving, at the cloud-managed service, communications received via the first connection in the first communication protocol;
translating the communications from the first communication protocol into the second communication protocol; and
sending the communications in the second communication protocol via the second connection.

\* \* \* \* \*